(12) United States Patent
Okoshi et al.

(10) Patent No.: US 9,562,154 B1
(45) Date of Patent: Feb. 7, 2017

(54) RESIN COMPOSITION, RESIN MOLDED ARTICLE, AND METHOD OF PREPARING RESIN COMPOSITION

(71) Applicant: FUJI XEROX CO., LTD., Tokyo (JP)

(72) Inventors: Masayuki Okoshi, Kanagawa (JP);
Daisuke Nakayama, Kanagawa (JP);
Tsuyoshi Miyamoto, Kanagawa (JP);
Hiroyuki Moriya, Kanagawa (JP);
Yuko Iwadate, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/996,771

(22) Filed: Jan. 15, 2016

(30) Foreign Application Priority Data

Sep. 25, 2015 (JP) .................................. 2015-188582

(51) Int. Cl.
| | |
|---|---|
| *C08K 3/40* | (2006.01) |
| *C08L 77/00* | (2006.01) |
| *C08L 79/08* | (2006.01) |
| *C08L 23/12* | (2006.01) |
| *C08L 25/00* | (2006.01) |
| *C08L 27/02* | (2006.01) |
| *C08L 81/06* | (2006.01) |
| *C08L 23/26* | (2006.01) |
| *C08L 59/02* | (2006.01) |
| *C08L 67/02* | (2006.01) |
| *C08L 69/00* | (2006.01) |
| *C08L 23/02* | (2006.01) |
| *C08L 55/02* | (2006.01) |

(52) U.S. Cl.
CPC .................. *C08L 23/12* (2013.01); *C08K 3/40* (2013.01); *C08L 23/02* (2013.01); *C08L 23/26* (2013.01); *C08L 25/00* (2013.01); *C08L 27/02* (2013.01); *C08L 55/02* (2013.01); *C08L 59/02* (2013.01); *C08L 67/02* (2013.01); *C08L 69/00* (2013.01); *C08L 77/00* (2013.01); *C08L 79/08* (2013.01); *C08L 81/06* (2013.01); *C08L 2205/03* (2013.01); *C08L 2205/08* (2013.01)

(58) Field of Classification Search
None
See application file for complete search history.

(56) References Cited

U.S. PATENT DOCUMENTS

| | | | | |
|---|---|---|---|---|
| 5,292,808 A | * | 3/1994 | Ohmae | ................... C08L 77/00 525/113 |
| 2003/0092814 A1 | | 5/2003 | Borgner et al. | |
| 2006/0185750 A1 | * | 8/2006 | Mestemacher | ......... C08L 23/02 138/137 |

FOREIGN PATENT DOCUMENTS

| | | |
|---|---|---|
| JP | H06-154191 A | 6/1994 |
| JP | 2003-528956 A | 9/2003 |
| JP | 2009-221267 A | 10/2009 |
| JP | 2014-181307 A | 9/2014 |

* cited by examiner

*Primary Examiner* — Ana Woodward
(74) *Attorney, Agent, or Firm* — Oliff PLC

(57) ABSTRACT

A resin composition including a thermoplastic resin, a glass fiber, a resin which is different from the thermoplastic resin and contains at least one of an amide bond and an imide bond, and a compatibilizer, wherein a part of the resin which is different from the thermoplastic resin and contains at least one of an amide bond and an imide bond forms a domain having a diameter of from 5 μm to 10 μm in a matrix of the thermoplastic resin.

20 Claims, 1 Drawing Sheet

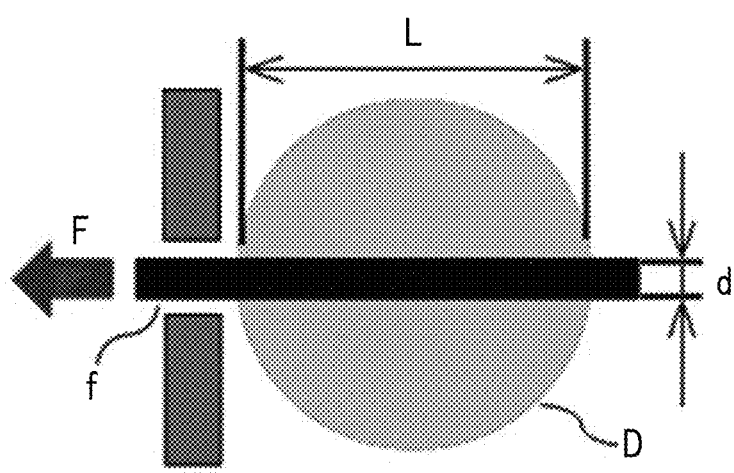

RESIN COMPOSITION, RESIN MOLDED ARTICLE, AND METHOD OF PREPARING RESIN COMPOSITION

CROSS-REFERENCE TO RELATED APPLICATIONS

This application is based on and claims priority under 35 USC 119 from Japanese Patent Application No. 2015-188582 filed Sep. 25, 2015.

BACKGROUND

1. Technical Field

The present invention relates to a resin composition, a resin molded article, and a method of preparing a resin composition.

2. Related Art

In the related art, various resin compositions are provided and are used for various applications.

In particular, resin compositions containing a thermoplastic resin are used in various components and cases of home electronics and automobiles or are used in various components such as cases of business machines and electric and electronic apparatuses.

SUMMARY

According to an aspect of the invention, there is provided a resin composition including:
  a thermoplastic resin;
  a glass fiber;
  a resin which is different from the thermoplastic resin and contains at least one of an amide bond and an imide bond; and
  a compatibilizer,
wherein a part of the resin which is different from the thermoplastic resin and contains at least one of an amide bond and an imide bond forms a domain having a diameter of from 5 μm to 10 μm in a matrix of the thermoplastic resin.

BRIEF DESCRIPTION OF THE DRAWINGS

Exemplary embodiments of the present invention will be described in detail based on the following FIGURES, wherein:

FIG. 1 is a schematic diagram showing a test used in a micro droplet method.

DETAILED DESCRIPTION

Hereinafter, an exemplary embodiment which is an example of a resin composition and a resin molded article according to the invention will be described.

Resin Composition

The resin composition according to the exemplary embodiment includes: a thermoplastic resin; a glass fiber; a resin which is different from the thermoplastic resin and contains at least one of an amide bond and an imide bond; and a compatibilizer.

A part of the resin which is different from the thermoplastic resin and contains at least one of an amide bond and an imide bond forms a domain having a diameter of from 5 μm to 10 μm in a matrix of the thermoplastic resin.

Hereinafter, the resin which is different from the thermoplastic resin and contains at least one of an amide bond and an imide bond will be referred to as "specific resin".

In recent years, in order to obtain a resin molded article having high mechanical strength, a resin composition containing a thermoplastic resin as a matrix and a glass fiber is used.

In the resin composition, when affinity between the glass fiber and the thermoplastic resin is low, a space is formed in an interface therebetween, and adhesion in the interface may deteriorate. Deterioration of the adhesion in the interface between the glass fiber and the thermoplastic resin is continued when a resin molded article is obtained from the resin composition, which may cause deterioration of the bending elastic modulus of the resin molded article.

On the other hand, a resin molded article having high bending elastic modulus has high hardness and thus is poor in impact resistance in general.

In particular, the glass fiber is weak to impact due to its own characteristics. Therefore, in a resin composition containing a glass fiber, it is currently desired that a resin molded article having superior bending elastic modulus may be obtained while preventing deterioration of impact resistance.

The resin composition according to the exemplary embodiment includes four components including: a thermoplastic resin; a glass fiber; a resin (specific resin) which is different from the thermoplastic resin and contains at least one of an amide bond and an imide bond; and a compatibilizer. A part of the specific resin forms a domain having a specific diameter in a matrix of the thermoplastic resin.

With the above-described configuration, a resin composition from which a resin molded article having superior bending elastic modulus may be obtained without deterioration of impact resistance may be provided.

The reason why the above effect is obtained is not clear but is presumed to be as follows.

When the resin composition is molten-kneaded in order to obtain a resin molded article from the resin composition according to the exemplary embodiment, the thermoplastic resin as the matrix and the compatibilizer are melted, and a part of the molecules of the compatibilizer and a part of the specific resin are compatibilized. As a result, the specific resin is dispersed in the resin composition.

In this state, when the dispersed specific resin contacts the glass fiber, the amide bond or the imide bond contained in the molecules of the specific resin and a polar group (hydroxy group) present on a surface of the glass fiber are physically bonded to each other through affinity (attraction and hydrogen bond).

In addition, in the resin composition according to the exemplary embodiment, the specific resin forms the above-described domain in the matrix of the thermoplastic resin. This configuration shows that the compatibility between the specific resin and the thermoplastic resin is low, and it is considered that, since the domain has a spherical structure, impact is likely to be dispersed due to the presence of the domain.

In addition, repulsion is generated between the thermoplastic resin and the specific resin which have low compatibility. Therefore, due to this repulsion, the contact frequency between the specific resin and the glass fiber increases. As a result, the amount or area of the specific resin bonded to the glass fiber increases. In this way, using the specific resin, the coating layer is formed around the glass fiber (refer to FIG. 1).

The specific resin forming the coating layer is also compatibilized with a part of the molecules of the compatibilizer. Therefore, by the compatibilizer being compatibilized with the thermoplastic resin, an equilibrium state is formed between attraction and repulsion, and the coating layer formed using the specific resin is thin and is substantially uniform.

On the other hand, the specific resin (a part of the specific resin) which is not bonded to a surface of the glass fiber as the coating layer forms a domain in the matrix of the thermoplastic resin as described above. Therefore, it is considered that the thin coating layer having superior uniformity is formed around the glass fiber.

As described above, the thin coating layer having superior uniformity is formed around the glass fiber using the specific resin. Therefore, it is presumed that the adhesion in the interface between the glass fiber and the thermoplastic resin is improved, a stress relaxation effect is exhibited by the coating layer and the domain, and a resin molded article capable of preventing deterioration of impact resistance and obtaining superior bending elastic modulus may be obtained.

Here, the resin composition according to the exemplary embodiment has a structure in which the coating layer is formed around the glass fiber using the specific resin through molten kneading during the preparation of the resin composition (for example, pellet). In addition, in the resin composition (and the resin molded article), for example, the compatibilizer is compatibilized between the coating layer and the thermoplastic resin.

In the resin composition according to the exemplary embodiment, the diameter of the domain, which is formed in the matrix of the thermoplastic resin using the specific resin, is from 5 μm to 10 μm and, from the viewpoint of exhibiting impact strength, is preferably from 5 μm to 8 μm.

When the diameter of the domain is 5 μm or more, the compatibility between the thermoplastic resin and the specific resin is low, and the coating layer may be easily formed on the surface of the glass fiber. In addition, by adjusting the diameter of the domain to be 10 μm or less, the incompatibility between the thermoplastic resin and the specific resin is excessively high, and the specific surface area of the domain decreases, which may cause deterioration of the adhesion in the interface between the glass fiber and the thermoplastic resin and the impact resistance.

The diameter of the domain is a value measured using the following method.

That is, a measurement sample is coated with an epoxy resin, and a precision-polished cross-section thereof is prepared using an automatic polisher (VECTOR, manufactured by Buehler).

This cross-section is randomly imaged using a SEM (S-3400N, manufactured by Hitachi High-Technologies Corporation; accelerating voltage: 15 KV) in three fields of view at a magnification of 1500 times. A brightness range is set such that all of coating layer components and flaking coating components (corresponding to the domain) in the glass fiber may be extracted using image analysis software (Image Pro Plus).

Next, the coating layer components are manually selectively excluded, only the flaking coating component (corresponding to the domain) are set as measurement objects, the diameters and the number of objects are selected and calculated, and the sizes (diameters) and number of the respective domains are obtained. Based on the obtained results, the average of the sizes (diameters) of the domains is obtained.

In the resin composition according to the exemplary embodiment, the thickness of the coating layer formed using the specific resin is preferably from 50 nm to 700 nm and, from the viewpoint of preventing deterioration of impact resistance and further improving bending elastic modulus, is preferably from 50 nm to 650 nm. When the thickness of the coating layer is 50 nm or more, deterioration of impact resistance is prevented, and bending elastic modulus is improved. When the thickness of the coating layer is 700 nm or less, the interface where the coating layer is formed between the glass fiber and the thermoplastic resin is prevented from being embrittled, and deterioration of bending elastic modulus is prevented.

The thickness of the coating layer is a value measured using the following method. A measurement target is cut in liquid nitrogen, and a cross-section thereof is observed using an electron microscope (VE-9800, manufactured by Keyence Corporation). In the cross-section, the thickness of the coating layer which is formed around the glass fiber is measured at 100 positions, and the average value thereof is obtained.

Hereinafter, the details of each component of the resin composition according to the exemplary embodiment will be described.

Thermoplastic Resin

The thermoplastic resin is the matrix of the resin composition and a resin component which is reinforced by the glass fiber (also referred to as "matrix resin").

The thermoplastic resin is not particularly limited, and examples thereof include polyolefin (PO), polyphenylene sulfide (PPS), polyamide (PA), polyimide (PI), polyamide imide (PAI), polyether imide (PEI), polyether ether ketone (PEEK), polyether sulfone (PES), polyphenyl sulfone (PPSU), polysulfone (PSF), polyethylene terephthalate (PET), polybutylene terephthalate (PBT), polyacetal (POM), polycarbonate (PC), polyvinylidene fluoride (PVDF), acrylonitrile-butadiene-styrene copolymers (ABS), and acrylonitrile styrene (AS).

Among these thermoplastic resins, one kind may be used alone, or two or more kinds may be used in combination.

Among these, polyolefin (PO) is preferable from the viewpoints of preventing deterioration of impact resistance, further improving bending elastic modulus, and reducing the cost.

Polyolefin is a resin containing a repeating unit derived from olefin and may contain another repeating unit derived from a monomer other than olefin in an amount of 30% by weight or lower with respect to the total weight of the resin.

Polyolefin is obtained by addition polymerization of olefin (optionally, the monomer other than olefin).

In addition, regarding each of olefin and the monomer other than olefin for obtaining polyolefin, one kind may be used alone, or two or more kinds may be used in combination.

Polyolefin may be a copolymer or a homopolymer. In addition, polyolefin may be linear or branched.

Examples of the olefin described herein include linear or branched aliphatic olefins and alicyclic olefins.

Examples of the aliphatic olefins include α-olefins such as ethylene, propylene, 1-butene, 1-hexene, 4-methyl-1-pentene, 1-octene, 1-decene, 1-hexadecene, and 1-octadecene.

In addition, examples of the alicyclic olefins include cyclopentene, cycloheptene, norbornene, 5-methyl-2-norbornene, tetracyclododecene, and vinylcyclohexane.

Among these, from the viewpoint of reducing the cost, α-olefin is preferable, ethylene or propylene is more preferable, and propylene is still more preferable.

In addition, the monomer other than olefin is selected from well-known addition-polymerizable compounds.

Examples of the addition-polymerizable compounds include: styrenes such as styrene, methylstyrene, α-methylstyrene, β-methylstyrene, t-butylstyrene, chlorostyrene, chloromethylstyrene, methoxystyrene, styrenesulfonic acid, and salts thereof; (meth)acrylates such as alkyl (meth)acrylate, benzyl (meth)acrylate, and dimethylaminoethyl (meth)acrylate; halovinyls such as vinyl chloride; vinyl esters such as vinyl acetate and vinyl propionate; vinyl ethers such as vinyl methyl ether; vinylidene halides such as vinylidene chloride; and N-vinyl compounds such as N-vinylpyrrolidone.

Example of preferable polyolefin in the exemplary embodiment include polypropylene (PP), polyethylene (PE), polybutene (PB), polyisobutylene (PIB), coumarone-indene resins, terpene resins, and ethylene-vinyl acetate copolymer resins (EVA).

Among these, a resin composed of only a repeating unit derived from olefin is preferable. In particular, from the viewpoint of reducing the cost, polypropylene is preferable.

The molecular weight of the thermoplastic resin is not particularly limited and may be determined according to, for example, the kind of the resin, molding conditions, and the use of the resin molded article. For example, when the thermoplastic resin is polyolefin, the weight average molecular weight (Mw) thereof is preferably from 10,000 to 300,000 and more preferably from 10,000 to 200,000.

As in the case of the molecular weight, the glass transition temperature (Tg) or melting temperature (Tm) of the thermoplastic resin is not particularly limited and may be determined according to, for example, the kind of the resin, molding conditions, and the use of the resin molded article. For example, when the thermoplastic resin is polyolefin, the melting temperature (Tm) thereof is preferably from 100° C. to 300° C. and more preferably from 150° C. to 250° C.

The weight average molecular weight (Mw) and melting temperature (Tm) of polyolefin is a value measured using the following method.

That is, the weight average molecular weight (Mw) of polyolefin is measured by gel permeation chromatography (GPC) under the following conditions. As a GPC system, a high-temperature GPC system "HLC-8321 GPC/HT" is used. As an eluent, o-dichlorobenzene is used. Polyolefin is dissolved in o-dichlorobenzene at a high temperature (140° C. to 150° C.), and the solution is filtered to obtain the filtrate as a measurement sample. The measurement is performed using an RI detector under the following measurement conditions of sample concentration: 0.5%, flow rate: 0.6 ml/min, and sample injection amount: 10 μl. In addition, a calibration curve is prepared from 10 samples, "Polystyrene Standard Sample TSK Standard": "A-500", "F-1", "F-10", "F-80", "F-380", "A-2500", "F-4", "F-40", "F-128", and "F-700" (manufactured by Tosoh Corporation).

In addition, the melting temperature (Tm) of polyolefin is calculated from the DSC curve obtained from differential scanning calorimetry (DSC) according to a "melting peak temperature" described in a method of calculating melting temperature in "Testing methods for transition temperatures of plastics" of JIS K7121-1987.

The content of the thermoplastic resin as the matrix may be determined according to, for example, the use of the resin molded article. For example, the content of the thermoplastic resin is preferably from 5% by weight to 95% by weight, more preferably from 10% by weight to 95% by weight, and still more preferably from 20% by weight to 95% by weight with respect to the total weight of the resin composition according to the exemplary embodiment.

When polyolefin is used as the thermoplastic resin, the content of polyolefin is preferably 20% by weight or higher with respect to the total weight of the thermoplastic resin as the matrix.

Glass Fiber

The glass fiber is not particularly limited, and a well-known glass fiber such as short fiber or long fiber may be used.

In addition, the glass fiber may undergo a well-known surface treatment.

As a surface treatment agent used for the surface treatment, for example, a silane coupling agent may be used from the viewpoint of obtaining affinity to polyolefin.

In addition, the fiber diameter, the fiber length, and the like of the glass fiber are not particularly limited and may be selected according to, for example, the use of the resin molded article.

Further, the form of the glass fiber is not particularly limited and may be selected according to, for example, the use of the resin molded article.

As the glass fiber, a commercially available product may be used, and examples thereof include RS 240 QR-483 and RE 480 QB-550 manufactured by Nitto Boseki Co., Ltd.

Among these glass fibers, one kind may be used alone, or two or more kinds may be used in combination.

The content of the glass fiber in the resin composition according to the exemplary embodiment is preferably from 0.1 parts by weight to 200 parts by weight, more preferably from 1 part by weight to 180 parts by weight, and still more preferably from 5 parts by weight to 150 parts by weight with respect to 100 parts by weight of the thermoplastic resin as the matrix.

By adjusting the content of the glass fiber to be 0.1 parts by weight or more with respect to 100 parts by weight of the thermoplastic resin, the resin composition is reinforced. In addition, by adjusting the content of the glass fiber to be 200 parts by weight or less with respect to 100 parts by weight of the thermoplastic resin, the moldability during the preparation of the resin molded article is superior.

Hereinafter, the content (part(s) by weight) with respect to 100 parts by weight of the thermoplastic resin as the matrix will also be abbreviated as "phr (per hundred resin)".

When represented by this abbreviation, the content of the glass fiber is from 0.1 phr to 200 phr.

Resin (Specific Resin) being Different from Thermoplastic Resin and Containing at Least One of Amide Bond and Imide Bond As described above, the specific resin according to the exemplary embodiment forms the domain having the specific diameter in the matrix of the thermoplastic resin and covers the periphery of the glass fiber.

This specific resin will be described in detail.

The specific resin has low compatibility to the thermoplastic resin as the matrix and may form the domain in the matrix of the thermoplastic resin.

Examples of the specific resin include a resin having a solubility parameter (SP value) different from that of the thermoplastic resin.

For example, the difference between the solubility parameter (SP value) of the thermoplastic resin and the solubility parameter (SP value) of the specific resin is preferably 3 or more and more preferably from 3 to 6 from the viewpoints of compatibility therebetween and repulsion therebetween.

The SP value is a value calculated according to Fedor's method. Specifically, the solubility parameter (SP value) may be calculated, for example, using the following expression according to the description of Polym. Eng. Sci., vol. 14, p. 147 (1974).

Expression: SP Value=$\sqrt{(Ev/v)}$=$\sqrt{(\Sigma \Delta ei/\Sigma \Delta vi)}$ (wherein, Ev: evaporation energy (cal/mol), v: molar volume (cm$^3$/mol), Δei: evaporation energy of each of atoms or an atom group, Δvi: molar volume of each of atoms or an atom group)

(cal/cm$^3$)$^{1/2}$ is adopted for the unit of the solubility parameter (SP values). However, the unit will be omitted in accordance with customs, and the SP values will be represented in a dimensionless form.

In addition, the specific resin contains at least one of an imide bond and an amide bond in the molecules thereof.

By containing the imide bond or the amide bond, the specific resin exhibits affinity to a polar group (hydroxy group) present on a surface of the glass fiber.

As the specific resin, specifically, a thermoplastic resin at least one of an imide bond and an amide bond in the main chain thereof, and specific examples thereof include polyamide (PA), polyimide (PI), polyamide imide (PAI), polyether imide (PEI), and polyamino acid.

It is preferable that the specific resin has low compatibility to the thermoplastic resin as the matrix and, for example, has a SP value different from that of the thermoplastic resin. Therefore, it is preferable that the specific resin is a different kind of thermoplastic resin from that of the thermoplastic resin as the matrix.

In particular, polyamide (PA) is preferable from the viewpoints of preventing deterioration of impact resistance, further improving bending elastic modulus, and obtaining superior adhesion with the glass fiber.

Here, the adhesion between the specific resin and the glass fiber is evaluated based on an index such as interfacial shear strength.

The interfacial shear strength is measured using a micro droplet method. Here, the micro droplet method will be described using a schematic diagram of a test shown in FIG. 1.

In a test using the micro droplet method, a droplet D (also called "resin droplet" or "resin ball") is attached to be fixed to a single fiber f by applying a liquid resin thereto, and the single fiber f is pulled out in a direction indicated by an arrow to evaluate the interfacial adhesion between the single fiber f and the droplet D.

Based on this test, the interfacial shear strength (τ) is calculated using the following expression.

$$\tau = \frac{F}{d\pi L}$$

In the expression, τ represents the interfacial shear strength, F represents the pull-out load, d represents the fiber diameter of the single fiber, and L represents the droplet length.

A high value of the calculated interfacial shear strength (τ) indicates high adhesion between the glass fiber and the specific resin and is also an index indicating that a resin molded article having high bending elastic modulus may be formed by selecting a combination of the glass fiber and the specific resin having a high interfacial shear strength.

Examples of the polyamide include products obtained by copolycondensation of dicarboxylic acid and diamine and products obtained by ring-opening polycondensation of lactam.

Examples of the dicarboxylic acid include oxalic acid, adipic acid, suberic acid, sebacic acid, terephthalic acid, isophthalic acid, 1,4-cyclohexanedicarboxylic acid, malonic acid, succinic acid, glutaric acid, pimelic acid, azelaic acid, and phthalic acid. Among these, adipic acid or terephthalic acid is preferable.

Examples of the diamine include ethylene diamine, pentamethylenediamine, hexamethylenediamine, nonanediamine, decamethylenediamine, 1,4-cyclohexanediamine, p-phenylenediamine, m-phenylenediamine, and m-xylenediamine. Among these, hexamethylenediamine is preferable.

Examples of the lactam include ε-caprolactam, undecanelactam, and lauryl lactam. Among these, ε-caprolactam is preferable.

Examples of polyamide, which is preferable from the viewpoints of affinity (adhesion) to the glass fiber and moldability of the resin molded article, include polyamide (PA6) obtained by ring-opening polycondensation of ε-caprolactom, nylon 6.6, nylon 6.10, nylons 1 to 12, nylon MXD known as an aromatic nylon, HT-1m, nylon 6-T, polyaminotriazole, polybenzimidazole, polyoxadiazole, polyamideimide, and piperidine polyimide. Among these, nylon 6.6 is preferable.

The molecular weight of the specific resin is not particularly limited as long as it is more likely to be melted than the thermoplastic resin which is present together as the matrix in the resin composition. For example, when the specific resin is polyamide, the weight average molecular weight thereof is preferably from 10,000 to 300,000 and more preferably from 10,000 to 100,000.

In addition, as in the case of the molecular weight, the glass transition temperature or melting temperature of the thermoplastic resin is not particularly limited as long as it is more likely to be melted than the thermoplastic resin which is present together as the matrix in the resin composition. For example, when the specific resin is polyamide, the melting temperature (Tm) thereof is preferably from 100° C. to 400° C. and more preferably from 150° C. to 350° C.

The content of the specific resin in the resin composition according to the exemplary embodiment is preferably from 0.1 parts by weight to 20 parts by weight, more preferably from 0.5 parts by weight to 20 parts by weight, and still more preferably from 1 part by weight to 20 parts by weight with respect to 100 parts by weight of the thermoplastic resin as the matrix.

By adjusting the content of the specific resin to be within the above-described range, the affinity to the glass fiber is obtained, and the bending elastic modulus may be improved.

From the viewpoint of effectively exhibiting the affinity to the glass fiber, it is preferable that the content of the specific resin is proportional to the content of the above-described glass fiber.

The content of the specific resin is preferably from 1% by weight to 10% by weight, more preferably 1% by weight to 9% by weight, and still more preferably 1% by weight to 8% by weight with respect to the weight of the glass fiber.

When the content of the specific resin is 1% by weight or higher with respect to the weight of the glass fiber, the affinity between the glass fiber and the specific resin is likely to be obtained. When the content of the specific resin is 10% by weight or lower with respect to the weight of the glass fiber, resin fluidity is improved.

Compatibilizer

The compatibilizer in the resin composition according to the exemplary embodiment improves the affinity between the thermoplastic resin as the matrix and the specific resin.

The compatibilizer may be determined according to the thermoplastic resin as the matrix.

It is preferable that the compatibilizer has the same structure as the thermoplastic resin which is the matrix and contains a portion having affinity to the above-described specific resin in a part of the molecules.

When polyolefin is used as the thermoplastic resin which is the matrix, a modified polyolefin may be used as the compatibilizer.

Here, when the thermoplastic resin is polypropylene (PP), modified polypropylene (PP) is preferable as the modified polyolefin. Likewise, when the thermoplastic resin is an ethylene-vinyl acetate copolymer resin (EVA), a modified ethylene-vinyl acetate copolymer resins (EVA) is preferable as the modified polyolefin.

Examples of the modified polyolefin include polyolefins into which a modification site containing a carboxyl group, a carboxylic anhydride residue, a carboxylate residue, an imino group, an amino group, an epoxy group, or the like.

From the viewpoints of further improving the affinity between the thermoplastic resin as the matrix and the specific resin and considering the upper limit temperature during molding, as the modification site introduced into polyolefin, a carboxylic anhydride residue is preferable, and a maleic anhydride residue is more preferable.

The modified polyolefin may be obtained using, for example, a method of causing a compound containing the above-described modification site to react with polyolefin such that the modification site is directly chemically bonded to polyolefin or a method of forming a graft chain using a compound containing the above-described modification site and bonding the graft chain to polyolefin.

Examples of the compound containing the above-described modification site include maleic anhydride, fumaric anhydride, citric anhydride, N-phenylmaleimide, N-cyclohexylmaleimide, glycidyl (meth)acrylate, glycidyl vinylbenzoate, N-[4-(2,3-epoxypropoxy)-3,5-dimethylbenzyl]acrylamide, alkyl (meth)acrylate, and derivatives thereof.

In particular, a modified polyolefin obtained by causing a reaction between maleic anhydride as an unsaturated carboxylic acid to react with polyolefin is preferable.

Specific examples of the modified polyolefin include acid-modified polyolefins such as maleic anhydride-modified polypropylene, maleic anhydride-modified polyethylene, a maleic anhydride-modified ethylene-vinyl acetate copolymer resin (EVA), and adducts or copolymers thereof.

As the modified polyolefin, a commercially available product may be used.

Examples of the modified propylene include YOUMEX (registered trade name) series (100TS, 110TS, 1001, 1010) manufactured by Sanyo Chemical Industries, Ltd.

Examples of the modified polyethylene include YOUMEX (registered trade name) series (2000) manufactured by Sanyo Chemical Industries, Ltd. and MODIC (registered trade name) series manufactured by Mitsubishi Chemical Corporation.

Examples of the modified ethylene-vinyl acetate copolymer resin (EVA) include MODIC (registered trade name) series manufactured by Mitsubishi Chemical Corporation.

The molecular weight of the compatibilizer is not particularly limited and, from the viewpoint of workability, is preferably from 5,000 to 100,000 and more preferably 5,000 to 80,000.

The content of the compatibilizer in the resin composition according to the exemplary embodiment is preferably from 0.1 parts by weight to 20 parts by weight, more preferably from 0.1 parts by weight to 18 parts by weight, and still more preferably from 0.1 part by weight to 15 parts by weight with respect to 100 parts by weight of the thermoplastic resin as the matrix.

By adjusting the content of the compatibilizer to be within the above-described range, the affinity between the thermoplastic resin as the matrix and the specific resin is improved, and the bending elastic modulus may be improved.

From the viewpoint of effectively exhibiting the affinity between the thermoplastic resin as the matrix and the specific resin, it is preferable that the content of the compatibilizer is proportional to the content of the above-described specific resin (is indirectly proportional to the content of the glass fiber).

The content of the compatibilizer is preferably from 1% by weight to 15% by weight, more preferably 1% by weight to 12% by weight, and still more preferably 1% by weight to 10% by weight with respect to the weight of the glass fiber.

When the content of the compatibilizer is 1% by weight or higher with respect to the weight of the glass fiber, the affinity between the glass fiber and the specific resin is likely to be obtained. When the content of the compatibilizer is 15% by weight or lower (in particular, 10% by weight or lower) with respect to the weight of the glass fiber, the remaining of an unreacted functional group which causes discoloration or deterioration is prevented.

Other Components

The resin composition according to the exemplary embodiment may contain other components in addition to the above-described components.

Examples of the other components include well-known additives such as a flame retardant, a flame retardant auxiliary agent, a dripping inhibitor during heating, a plasticizer, an antioxidant, a release agent, a light resistant agent, a weather resistant agent, a colorant, a pigment, a modifier, an antistatic agent, a hydrolysis inhibitor, a filler, a reinforcing agent other than the glass fiber, (for example, talc, clay, mica, glass flake, milled glass, glass beads, crystalline silica, alumina, silicon nitride, aluminum nitride, or boron nitride).

The content of the other components is preferably from 0 parts by weight to 10 parts by weight and more preferably from 0 parts by weight to 5 parts by weight with respect to 100 parts by weight of the thermoplastic resin as the matrix. Here, "0 parts by weight" represents that the resin composition does not contain the other components.

Method of Preparing Resin Composition

The resin composition according to the exemplary embodiment is prepared by molten-kneading the respective components.

Here, a well-known unit is used as a molten-kneading unit, and examples thereof include a twin-screw extruder, a Henschel mixer, a Bunbury mixer, a single-screw extruder, a multi-screw extruder, and a co-kneader.

The temperature (cylinder temperature) during moltenkneading may be determined according to, for example, the melting temperature of the resin components constituting the resin composition.

In particular, it is preferable that the resin composition according to the exemplary embodiment is obtained using a preparing method including: molten-kneading the thermoplastic resin, the glass fiber, the specific resin, and the compatibilizer. When the thermoplastic resin, the glass fiber, the specific resin, and the compatibilizer are collectively molten-kneaded, the coating layer which is formed around the glass fiber using the specific resin is likely to be thin and substantially uniform. Therefore, deterioration of impact resistance is prevented, and bending elastic modulus is improved.

Resin Molded Article

The resin molded article according to the exemplary embodiment includes four components including: a thermoplastic resin; a glass fiber; a resin (specific resin) which is different from the thermoplastic resin and contains at least one of an amide bond and an imide bond; and a compatibilizer. That is, the resin molded article according to the exemplary embodiment has the same composition as the resin composition according to the exemplary embodiment. A part of the specific resin forms a domain having a diameter of from 5 µm to 10 µmin the matrix of the thermoplastic resin. In addition, apart of the specific resin forms a coating layer around the glass fiber.

The resin molded article according to the exemplary embodiment may be obtained by preparing the resin composition according to the exemplary embodiment and molding the resin composition, or may be obtained by preparing a composition containing components other than the glass fiber and mixing the composition with the glass fiber during molding.

Examples of a molding method include injection molding, extrusion molding, blow molding, hot press molding, calendering, coating molding, cast molding, dipping molding, vacuum molding, and transfer molding.

As the molding method of the resin molded article according to the exemplary embodiment, injection molding is preferable from the viewpoint of obtaining high degree of freedom for the shape.

The cylinder temperature during injection molding is, for example, from 180° C. to 300° C. and preferably from 200° C. to 290° C. The mold temperature during injection molding is, for example, from 30° C. to 100° C. and preferably from 30° C. to 60° C.

The injection molding may be performed using a commercially available machine such as "NEX150" (manufactured by Nissei Plastic Industrial Co. Ltd.), "NEX70000" (manufactured by Nissei Plastic Industrial Co. Ltd.), or "SE50D" (manufactured by Toshiba Machine Co., Ltd.).

The resin molded article according to the exemplary embodiment is preferably used in applications such as electronic and electric apparatuses, business machines, home electronics, automobile interior materials, and containers. Specific examples of the applications include: cases of electronic and electric apparatuses and home electronics; various components of electronic and electric apparatuses and home electronics, automobile interior components; storage cases of CD-ROM, DVD, and the like; tableware; beverage bottles; food trays; wrapping materials; films; and sheets.

In addition, the resin molded article according to the exemplary embodiment is preferably used for a building member such as a curtain rail or an outdoor fire extinguisher cover box.

EXAMPLES

Hereinafter, the invention will be described in more detail using Examples but is not limited to these examples.

Examples 1 to 9 and Comparative Examples 1 to 10

Pellets of resin compositions are obtained by kneading components shown in Tables 1 to 2 using a twin-screw extruder (TEM58SS, manufactured by Toshiba Machine Co., Ltd.) at a cylinder temperature (molten-kneading temperature) shown in Tables 1 and 2.

The obtained pellets are molded using an injection molding machine (NEX150, manufactured by Nissei Plastic Industrial Co., Ltd.) at a cylinder temperature (injection molding temperature) shown in Tables 1 and 2 and a mold temperature of 50° C. to obtain ISO multi-purpose dumbbell specimens (corresponding to ISO 527 tensile test and ISO 178 bending test; thickness: 4 mm, width: 10 mm) and D2 specimens (length: 60 mm, width: 60 mm, thickness: 2 mm).

Evaluation

Using the obtained two kinds of specimens, the following evaluation is performed.

The results are shown in Tables 1 and 2.

Impact Resistance

Regarding the obtained ISO multi-purpose dumbbell specimen, agate is provided on both sides in a length direction, and a notch is formed on the specimen. Using the specimen, the impact resistance is measured in a Charpy impact test using an evaluation device (DG-UB2, manufactured by Toyo Seiki Seisaku-Sho, Ltd.) according to JIS-K7111 (2006).

Bending Elastic Modulus

Regarding each of the obtained ISO multi-purpose dumbbell specimens, the bending elastic modulus is measured using a universal tester (AUTOGRAPH AG-Xplus, manufactured by Shimadzu Corporation) according to a method defined in ISO 178.

Tensile Strength and Elongation

Regarding each of the obtained ISO multi-purpose dumbbell specimens, the tensile strength and elongation are measured using an evaluation device (precision universal tester AUTOGRAPH AG-IS, manufactured by Shimadzu Corporation, 5 kN) according to a method defined in ISO 527.

Deflection Temperature Under Load (HDT)

Regarding each of the obtained ISO multi-purpose dumbbell specimens, a deflection temperature (° C.) under a load of 1.8 MPa is measured using a HDT measuring device (HDT-3, manufactured by Toyo Seiki Seisaku-Sho, Ltd.) according to a method defined in ISO 178 bending test.

Dimensional Change Rate

Each of the obtained D2 specimens is kept for 24 hours under conditions of 28° C. and 31% RH, and the dimensional change rate (%) between the dimensions before and after the keeping in a TD direction and an MD direction of the specimen is measured.

The dimensional change is measured using a measuring microscope (STM6-LM, manufactured by Olympus Corporation).

Measurement of Diameter of Domain

Using each of the obtained D2 specimens, the diameter of the domain formed using the specific resin is measured using the method in the related art.

In addition, in Tables 1 and 2, the symbol "-" represents that the domain is not formed.

Measurement of Thickness of Coating Layer

Using each of the obtained D2 specimens, the thickness of a coating layer is measured using the method in the related art.

Before the measurement, whether or not a coating layer is formed is determined. In Tables 1 and 2, the symbol "-" represents that the coating layer is not present (is not formed).

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Composition | Thermoplastic Resin | Polypropylene | 100 | 100 | 100 | 100 | 100 | 100 | 100 | 100 | 100 |
| | Glass Fiber | Glass Fiber 1 | 5 | 200 | 25 | 5 | 25 | 200 | 5 | 25 | 200 |
| | Specific Resin | Polyamide 1 | 0.1 | 200 | 5 | | | | | | |
| | | Polyamide 2 | | | | 0.1 | 200 | 5 | | | |
| | | Polyamide 3 | | | | | | | 0.1 | 20 | 5 |
| | Compatibilizer | Maleic Anhydride-Modified PP | 0.1 | 20 | 3 | 0.1 | 20 | 3 | 0.1 | 20 | 3 |
| | Total (part(s) by weight) | | 105.2 | 340 | 133 | 105.2 | 165 | 308 | 105.2 | 165 | 308 |
| Conditions | Molten-Kneading Temperature (° C.) | | 230 | 230 | 230 | 230 | 230 | 230 | 290 | 290 | 290 |
| | Injection Molding Temperature (° C.) | | 230 | 230 | 230 | 230 | 230 | 230 | 290 | 290 | 290 |
| Evaluation | Impact Resistance (kJ/m$^2$) | | 6.8 | 9.7 | 9.8 | 6.7 | 11.5 | 9.5 | 6.5 | 10.8 | 9.4 |
| | Bending Elastic Modulus (Gpa) | | 8.9 | 20.5 | 12.1 | 8.9 | 10.2 | 19.8 | 9 | 12.5 | 21.5 |
| | Tensile Strength (MPa) | | 48 | 168 | 68 | 45 | 68 | 185 | 86 | 131 | 174 |
| | Elongation (%) | | 5.0 | 1.0 | 2.0 | 4.8 | 1.2 | 1.1 | 1.2 | 0.8 | 0.4 |
| | Deflection Temperature (° C.) Under Load (HDT) | | 125 | 132 | 141 | 131 | 145 | 168 | 132 | 162 | 211 |
| | Dimensional Change Rate TD/MD (%) | | 0.5/0.4 | 0.1/0.08 | 0.2/0.1 | 0.5/0.4 | 0.1/0.08 | 0.1/0.08 | 0.5/0.4 | 0.1/0.08 | 0.1/0.08 |
| | Diameter (μm) of Domain | | 5.1 | 7.9 | 6.3 | 5.2 | 7.8 | 6.1 | 5.5 | 7.1 | 5.8 |
| | Thickness (nm) of Coating Layer | | 100 | 680 | 320 | 90 | 650 | 330 | 100 | 670 | 320 |

TABLE 2

| | | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|---|
| Composition | Thermoplastic Resin | Polypropylene | 100 | 100 | 100 | 100 | 100 | 100 | 100 | 100 | 100 | 100 |
| | Glass Fiber | Glass Fiber 1 | | | | 5 | 25 | 200 | 25 | 25 | 25 | 25 |
| | Specific Resin | Polyamide 1 | | 0.1 | 20 | | | | | | | |
| | Compatibilizer | Maleic Anhydride-Modified PP | | 0.1 | 20 | | | | | 3 | 10 | |
| | Modifier | Copolymer A | | | | | | | | | | 20 |
| | Total (part(s) by weight) | | 100 | 100.2 | 140 | 105 | 125 | 300 | 130 | 128 | 185 | 145 |
| Conditions | Molten-Kneading Temperature (° C.) | | 200 | 240 | 240 | 240 | 240 | 240 | 240 | 240 | 240 | 240 |
| | Injection Molding Temperature (° C.) | | 200 | 240 | 240 | 240 | 240 | 240 | 240 | 240 | 240 | 240 |
| Evaluation | Impact Resistance (kJ/m$^2$) | | 5.2 | 3.1 | 3.6 | 4.1 | 4.5 | Molding Failure | 2.4 | 4.5 | 5.4 | 4.8 |
| | Bending Elastic Modulus (Gpa) | | 1.3 | 1.3 | 1.4 | 1.5 | 7.5 | — | 5.9 | 8.1 | 6.8 | 8.1 |
| | Tensile Strength (MPa) | | 34 | 33 | 39 | 40 | 49 | — | 49 | 49 | 55 | 61 |
| | Elongation (%) | | 82 | 56 | 16 | 11 | 4.4 | — | 3.2 | 1.6 | 0.8 | 0.7 |
| | Deflection Temperature (° C.) Under Load (HDT) | | 98 | 99 | 108 | 100 | 115 | — | 111 | 110 | 135 | 145 |
| | Dimensional Change Rate TD/MD (%) | | 1.1/0.98 | 1.2/1.2 | 1.0/0.9 | 0.8/0.7 | 0.5/0.6 | — | 0.5/0.5 | 0.5/0.6 | 0.5/0.6 | 0.5/0.6 |
| | Diameter (μm) of Domain | | — | 23 | 15 | — | — | — | 26 | — | 15 | 12 |
| | Thickness (nm) of Coating Layer | | — | 1200 | 1500 | — | — | — | 1200 | — | 1600 | 1200 |

The details of materials shown in Tables 1 and 2 are as follows.

Thermoplastic Resin
Polypropylene (NOVATEC (registered trade name) PP MA3, manufactured by Japan Polypropylene Corporation), SP value: 9.3

Glass Fiber
Glass fiber 1 (RS 240 QR-483, manufactured by Nitto Boseki Co., Ltd., surface-treated using silica surface treatment agent)

Specific Resin
Polyamide 1 (PA6, ZYTEL (registered trade name) 7331J, manufactured by Dupont), SP value: 13.6
Polyamide 2 (PA11, RILSAN (registered trade name) PA11, manufactured by Arkema K.K.), SP value: 7.1
Polyamide 3 (PA66, 101L, manufactured by Dupont), SP value: 11.6

Compatibilizer
Maleic anhydride-modified PP: maleic anhydride-modified polypropylene (YOUMEX (registered trade name) 110TS, manufactured by Sanyo Chemical Industries, Ltd.)

Modifier
Copolymer A
Maleic anhydride-modified polypropylene (YOUMEX (registered trade name) 110TS, manufactured by Sanyo Chemical Industries, Ltd.) is mixed (dry-blended) with polyamide 6 (ZYTEL (registered trade name) 7331J, manufactured by Dupont) in a dry state at a mixing ratio of 3:5 (weight ratio; YOUMEX 110TS:ZYTEL 7331J). A pellet is obtained by kneading the mixture using a twin-screw extruder (TEM58SS, manufactured by Toshiba Machine Co., Ltd.) at a cylinder temperature of 240° C. This pellet is used as Copolymer A.

It is found from the above results that, in Examples, under a condition where the content of the glass fiber is the same, a resin molded article having superior bending elastic modulus is able to be obtained as compared to Comparative Examples.

In addition, it is also found that, in Examples, impact resistance is higher than that of Comparative Examples.

In Comparative Example 6, molding failure occurred, and thus the above-described evaluation is not performed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
a thermoplastic resin;
a glass fiber;
a resin which is different from the thermoplastic resin and contains at least one of an amide bond and an imide bond; and
a compatibilizer,
wherein a part of the resin which is different from the thermoplastic resin and contains at least one of an amide bond and an imide bond forms a domain having a diameter of from 5 μm to 10 μm in a matrix of the thermoplastic resin, and wherein a part of the resin which is different from the thermoplastic resin and contains at least one of an amide bond and an imide bond forms a coating layer around the glass fiber.

2. The resin composition according to claim 1,
wherein the thickness of the coating layer is from 50 nm to 700 nm.

3. The resin composition according to claim 1,
wherein the content of the resin which is different from the thermoplastic resin and contains at least one of an amide bond and an imide bond is from 1% by weight to 10% by weight with respect to the weight of the glass fiber.

4. The resin composition according to claim 1,
wherein the thermoplastic resin is polyolefin.

5. The resin composition according to claim 1,
wherein the resin which is different from the thermoplastic resin and contains at least one of an amide bond and an imide bond is polyamide.

6. The resin composition according to claim 1,
wherein the compatibilizer is a chemically modified polyolefin.

7. The resin composition according to claim 1,
wherein the content of the glass fiber is from 0.1 parts by weight to 200 parts by weight with respect to 100 parts by weight of the thermoplastic resin.

8. The resin composition according to claim 1,
the content of the resin which is different from the thermoplastic resin and contains at least one of an amide bond and an imide bond is from 0.1 parts by weight to 20 parts by weight with respect to 100 parts by weight of the thermoplastic resin.

9. The resin composition according to claim 1,
wherein the content of the compatibilizer is from 0.1 parts by weight to 20 parts by weight with respect to 100 parts by weight of the thermoplastic resin.

10. The resin composition according to claim 1,
wherein the content of the compatibilizer is from 1% by weight to 15% by weight with respect to the weight of the glass fiber.

11. A method of preparing the resin composition according to claim 1, comprising:
molten-kneading the thermoplastic resin, the glass fiber, the resin which is different from the thermoplastic resin and contains at least one of an amide bond and an imide bond, and the compatibilizer.

12. The resin composition according to claim 1,
wherein the thermoplastic resin is polyolefin, the resin which is different from the thermoplastic resin and contains at least one of an amide bond and an imide bond is polyamide, and the compatibilizer is a chemically modified polyolefin.

13. The resin composition according to claim 1,
wherein the difference between the solubility parameter (SP value) of the thermoplastic resin and the solubility parameter (SP value) of the resin which is different from the thermoplastic resin and contains at least one of an amide bond and an imide bond is 3 or more.

14. A resin molded article comprising:
a thermoplastic resin;
a glass fiber;
a resin which is different from the thermoplastic resin and contains at least one of an amide bond and an imide bond; and a compatibilizer, wherein a part of the resin which is different from the thermoplastic resin and contains at least one of an amide bond and an imide bond forms a domain having a diameter of from 5 µm to 10 µm in a matrix of the thermoplastic resin, and wherein a part of the resin which is different from the thermoplastic resin and contains at least one of an amide bond and an imide bond forms a coating layer around the glass fiber.

15. The resin molded article according to claim 14, wherein the thickness of the coating layer is from 50 nm to 700 nm.

16. The resin molded article according to claim 14, wherein the content of the resin which is different from the thermoplastic resin and contains at least one of an amide bond and an imide bond is from 1% by weight to 10% by weight with respect to the weight of the glass fiber.

17. The resin molded article according to claim 14, wherein the thermoplastic resin is polyolefin.

18. The resin molded article according to claim 14, wherein the resin which is different from the thermoplastic resin and contains at least one of an amide bond and an imide bond is polyamide.

19. The resin molded article according to claim 14, wherein the compatibilizer is a chemically modified polyolefin.

20. The resin molded article according to claim 14, wherein the content of the glass fiber is from 0.1 parts by weight to 200 parts by weight with respect to 100 parts by weight of the thermoplastic resin.

* * * * *